United States Patent [19]
Olson

[11] 4,352,142
[45] Sep. 28, 1982

[54] COMPOSITE AIRCRAFT STRUCTURE HAVING LIGHTNING PROTECTION

[75] Inventor: Glenn O. Olson, Seattle, Wash.

[73] Assignee: The Boeing Company, Seattle, Wash.

[21] Appl. No.: 254,799

[22] Filed: Apr. 15, 1981

[51] Int. Cl.³ .............................................. H05F 3/00
[52] U.S. Cl. ..................................... 361/218; 361/117
[58] Field of Search ................. 361/218, 117, 217, 212

[56] References Cited

U.S. PATENT DOCUMENTS

| | | | |
|---|---|---|---|
| 3,480,231 | 11/1967 | Lumn | 361/218 |
| 3,482,802 | 12/1969 | Lumn | 361/218 |
| 3,498,572 | 3/1970 | Lumn | 361/218 |
| 3,906,308 | 9/1975 | Amason et al. | 361/218 |
| 3,989,984 | 11/1976 | Amason et al. | 361/218 |

Primary Examiner—J. D. Miller
Assistant Examiner—L. C. Schroeder
Attorney, Agent, or Firm—Conrad O. Gardner; B. A. Donahue

[57] ABSTRACT

A lightning protection system for advanced composite aircraft structures consisting of a sandwich structure including two layers of aluminum foil separated by a layer of dielectric material. The sandwich structure is applied to the surface of the composite aircraft structure desired to be protected from lightning strike damage thereby confining damage to the sandwich structure which can be removed and replaced.

4 Claims, 2 Drawing Figures

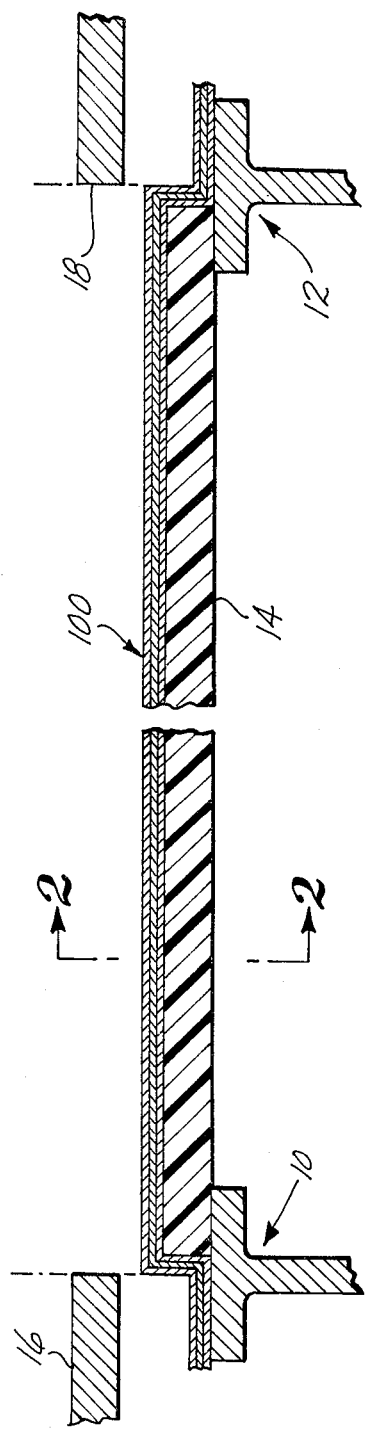
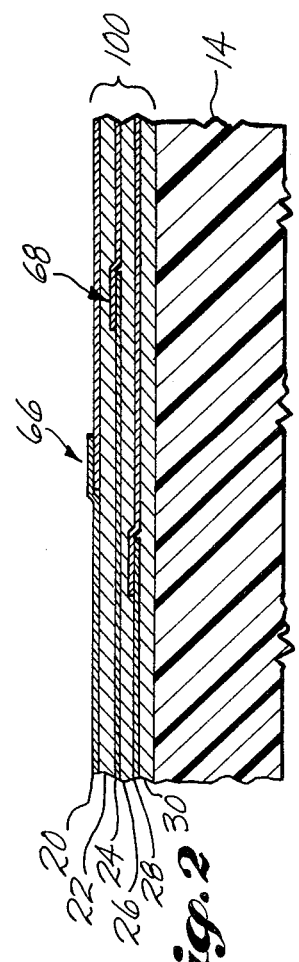

COMPOSITE AIRCRAFT STRUCTURE HAVING LIGHTNING PROTECTION

The invention described herein was made in the performance of work under a NASA contract and is subject to the provisions of Section 305 of the National Aeronautics and Space Act of 1948, Public Law 85-568 (72 Stat. 435; 42 USC 2457).

The present invention relates to aircraft lightning protection systems and, more particularly, to a lightning protection system for advanced composite aircraft structures such as graphite epoxy and the like. Lightning strikes involving aircraft are a common occurrence and therefore aircraft lightning protection systems are needed for the prevention of structural failures, flight control system damage, fuel explosion, and electrical or electronic systems malfunctions caused by lightning strikes.

In the patent literature, U.S. Pat. No. 3,906,308 is illustrative of a lightning protection system for advanced composite aircraft structures such as boron and graphite epoxy composites. In accordance with the system of U.S. Pat. No. 3,906,308, the critical component desired to be protected such as a composite skin panel, composite fuel tank access door or other component located at the aircraft external surface, is covered by a thin dielectric coating and/or films of the appropriate dielectric strength and thickness to provide a complete dielectric surface upon which is disposed a foil or metal strips of appropriate dimension affixed to the dielectric material thereby providing dwell points for the sweptstroke and restrike lightning current channel. These metallic strips are installed perpendicularly to the airstream or at an angle from the airstream direction and are grounded to metallic airplane structure at one or both ends. In contrast, the present aircraft lightning protection system for a composite aircraft structure utilizes a thin metal-dielectric-metal sandwich which is utilized to cover the region to be protected and which can be easily removed and replaced in the event of damage to the sandwich structure.

It is accordingly an object of the present invention to provide in a composite aircraft structure, a two-metal sandwich structure for providing surface protection of the composite aircraft structure with respect to lightning strikes.

It is a further object of the present invention to provide means for nullifying thermal and right-angle-effect of lightning arc attachment to an advanced composite aircraft structure.

A full understanding of the invention, and of its further objects and advantages and the several unique aspects thereof, will be had from the following description when taken in conjunction with the accompanying drawings in which:

FIG. 1 is a side view in section of an aircraft structure having an advanced composite structural member; and, FIG. 2 is a sectional view taken along the lines 2—2 of the composite structural member shown in FIG. 1.

Turning now to FIG. 1, an exterior aircraft structural member 14 made of an advanced composite material such as graphite epoxy will be seen to be supported by typical rib and/or spar support members 10 and 12 and include typical caps, leading edges and/or access panel members 16 and 18. Lightning protection sandwich structure 100 in accordance with the teachings of the present invention is seen applied to composite exterior surface member 14. It will be recognized that graphite epoxy composite structures and other composite structures utilized on current and future aircraft will be subjected to lightning strike discharges. This is particularly the case if the exterior surface structure is utilized at or near the aircraft protuberances such as wing tip, stabilizer tip, vertical fin tip, rudder, elevator, aileron, etc. Such locations will be subjected to the initial attachment lightning strike. The initial attachment lightning strike as characterized by high peak current ($2(10)^5$ Amp) and large energy transfer ($2(10)^6$ Amp$^2$ Sec) is capable of creating severe structural damage to unprotected graphite epoxy structures. Accordingly, such composite structures which are exposed to lightning strikes at the exterior of the aircraft, particularly those near aircraft protuberances, will necessitate lightning protection, preferably a lightning protection system as shown at 100 in FIG. 1 which will substantially confine damage to the lightning protection system 100 and facilitate removal and replacement thereof without costly repair to the underlying composite external surface member 14.

Turning now to FIG. 2, it will be seen that lightning protection sandwich structure 100 for underlying composite external surface member 14 includes a pair of outer layers of aluminum foil 20 and 28 between which is sandwiched an intermediate dielectric layer 24. Layers of adhesive material 22 and 26 are utilized to sandwich and affix dielectric layer 24 between outer sandwich aluminum foil layers 20 and 28. The further adhesive layer 30 is utilized between inner aluminum foil layer 28 and composite external surface member 14 to adhere the sandwich structure 100 to the outer surface of composite external surface member 14.

A primary advantage of the lightning protection sandwich structure 100 is that the thermal and right-angle-effect of the lightning arc attachment to graphite epoxy skin 14 of the aircraft is nullified. Substantially all damage is confined to the protection system 100 which may be easily removed and replaced. Lightning tests accomplished on several prototype systems appear to demonstrate the aforementioned theory behind the feasibility and performance advanced for the present lightning protection system 100 for composite external surface member 14.

The right-angle-effect is herein defined as the interaction of forces between the current paths taken by the lightning. That is, if the arc attachment is normal to the aircraft surface, the lightning current flows away from the attachment point along the direction of the graphite fibers. Such graphite fibers in advanced composite graphite epoxy structures comprise angle ply laminates (e.g., 0°, ±45°, 90°). Therefore, in addition to the right-angle-effect, buckling forces are also created between the plies of the laminate when the current is forced to flow in different directions in each ply at the arc attachment point. Both of these effects are herein termed right-angle-effects.

Three-inch-wide, 5.5 mil thickness aluminum foil with nonconductive adhesive backing was utilized for aluminum foil members 20 and 28, requiring about one-fourth inch overlap as shown at 66 in FIG. 2. With wider aluminum foil nonconductive adhesive backed tape, a lesser number of overlaps would be required and, in fact, if the aluminum foil members with nonconductive adhesive backing were of substantial width they could be cut to the width of the composite member 14 without requiring an overlap as shown at 66. Aluminum foil members 20 and 28 at the outer layers of sandwich structure 100 may have a thickness from about two to about six mils. Dielectric layer 24 may comprise a dielectric film, e.g., Tedlar film, a bondable polyvinyl fluoride (PVF) available in one-half to three mil thickness. The thickness of dielectric layer 24 may be from about one to about seven mils thickness. Adhesive layers 22, 24, and 30 may comprise a nonconductive adhesive such as type AF-143 as available from 3M Company. Test results indicated that the present surface lightning protection sandwich structure 100 substantially eliminated thermal damage and inter-intra-lamina buckling damage characterized by respective burning of resin and twisted/torn fibers of the laminae at the lightning attachment point of a graphite epoxy laminate 14 utilized in an aircraft advanced composite surface or skin structure.

What is claimed is:

1. An aircraft structure comprising in combination:
    a graphite epoxy laminate layer;
    a sandwich structure applied to one major surface area of said graphite epoxy laminate layer; said sandwich structure comprising a pair of layers of aluminum foil having a layer of dielectric material disposed between said pair of layers of aluminum foil.

2. A lightning protection system for protecting a lightning accessible surface of an aircraft comprising:
    a sandwich structure disposed adjacent said lightning accessible surface;
    said sandwich structure having a pair of outer layers of electrically conductive material and an inner layer of electrically nonconductive material.

3. The invention according to claim 2 wherein said outer layers of electrically conductive material have a thickness of between 2 and 6 mils, and said inner layer of electrically nonconductive material has a thickness of between 1 and 7 mils.

4. In combination in an aircraft surface member:
    a layer of composite laminate material; and,
    a sandwich structure attached to said layer of composite laminate material for substantially nullifying right-angle-effects of lightning arc attachment to said layer of composite laminate material.

* * * * *